United States Patent
Iwasaki

(10) Patent No.: US 11,537,302 B2
(45) Date of Patent: Dec. 27, 2022

(54) PRINTER CONFIGURED TO CONTROL PRINTING OPERATION USING INFORMATION STORED IN FLASH MEMORIES

(71) Applicant: TOSHIBA TEC KABUSHIKI KAISHA, Tokyo (JP)

(72) Inventor: Fumiharu Iwasaki, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/332,946

(22) Filed: May 27, 2021

(65) Prior Publication Data

US 2022/0066668 A1     Mar. 3, 2022

(30) Foreign Application Priority Data

Sep. 1, 2020  (JP) .............................. JP2020-147012

(51) Int. Cl.
*G06F 3/06*         (2006.01)
*G06F 3/12*         (2006.01)

(52) U.S. Cl.
CPC .......... *G06F 3/0632* (2013.01); *G06F 3/0679* (2013.01); *G06F 3/1257* (2013.01); *G06F 3/1279* (2013.01)

(58) Field of Classification Search
None
See application file for complete search history.

(56) References Cited

U.S. PATENT DOCUMENTS

| 7,457,943 | B2 | 11/2008 | Hiramatsu et al. |
| 8,345,295 | B2 | 1/2013 | Kim |
| 2005/0050360 | A1* | 3/2005 | Hiramatsu ......... G03G 15/5004 726/4 |
| 2017/0227895 | A1* | 8/2017 | Shibuya ............. G03G 15/1665 |

FOREIGN PATENT DOCUMENTS

JP          2010-176398 A         8/2010

OTHER PUBLICATIONS

Extended European Search Report dated Jan. 4, 2022 in corresponding European Patent Application No. 21183111.0, 7 pages.

* cited by examiner

*Primary Examiner* — Lennin R Rodriguezgonzalez
(74) *Attorney, Agent, or Firm* — Kim & Stewart LLP

(57) ABSTRACT

A printer includes a first flash memory of a NOR type, a second flash memory of a NAND type, and a processor configured to control execution of a printing operation using information stored in the first and second flash memories. The processor is further configured to, at startup, read first information stored in the first flash memory and perform an initialization process using the first information.

15 Claims, 3 Drawing Sheets

# PRINTER CONFIGURED TO CONTROL PRINTING OPERATION USING INFORMATION STORED IN FLASH MEMORIES

CROSS-REFERENCE TO RELATED APPLICATION

This application is based upon and claims the benefit of priority from Japanese Patent Application No. 2020-147012, filed Sep. 1, 2020, the entire contents of which are incorporated herein by reference.

FIELD

Embodiments described herein relate generally to printers and methods for controlling printers.

BACKGROUND

In the related art, there is known a printer using a flash memory of a NAND type. It is also known that there is not only NAND type flash memory but also NOR type flash memory. The NAND type flash memory and the NOR type flash memory have different features and characteristics.

However, there is a demand for a printer that can work with both the f NAND type and NOR type flash memory.

DETAILED DESCRIPTION

Embodiments provide a printer capable of working with a flash memory of a NAND type and a flash memory of a NOR type.

A printer according to an embodiment includes a first flash memory of a NOR type, a second flash memory of a NAND type, and a processor configured to control execution of a printing operation using information stored in the first and second flash memories. The processor is further configured to, at startup, read first information stored in the first flash memory and perform an initialization process using the first information.

Hereinafter, certain example embodiments of printers will be described with reference to the accompanying drawings. It is noted that the embodiments described below refer to printers but possible embodiments are not limited thereto.

First Embodiment

Figure 1:
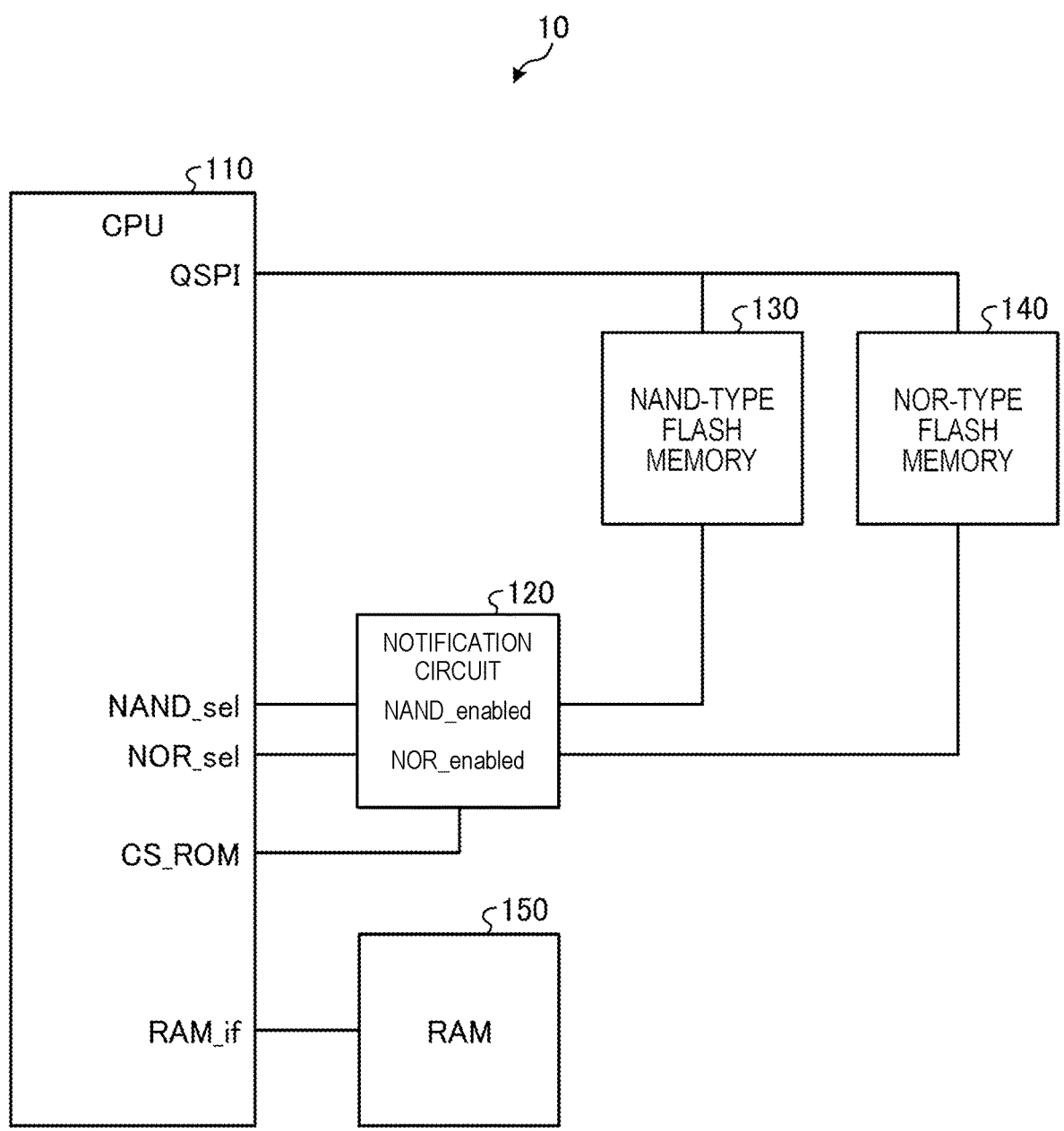
FIG. 1 is a diagram illustrating a control mechanism of a printer according to a first embodiment.

FIG. 1 is a diagram illustrating a control mechanism of a printer 10 according to a first embodiment. The printer includes a central processing unit (CPU) 110, a notification circuit 120, a NAND-type flash memory 130, a NOR-type flash memory 140, and a random access memory (RAM) 150.

The CPU 110 controls the overall operations of the printer 10. The CPU 110 is connected to the notification circuit 120, the NOR-type flash memory 140, the NAND-type flash memory 130, and the RAM 150.

The CPU 110 outputs a QSPI (quad serial peripheral interface) signal, a NAND_sel signal, a NOR_sel signal, a CS_ROM signal, and a RAM_if signal.

The QSPI signal is output to the NAND-type flash memory 130 and the NOR-type flash memory 140 according to the QSPI standard. The QSPI is a serial interface for the CPU 110 to communicate with the NAND-type flash memory 130 and the NOR-type flash memory 140.

The NAND_sel signal is a signal indicating that the CPU 110 selects the NAND-type flash memory 130. At startup, when the printer 10 is being initialized or turned on or upon return from a prolonged off or idle state, the NAND_sel signal is set to invalid (disabled), which indicates the NAND-type flash memory 130 is not selected. Then, after reading out data from the NOR-type flash memory 140, the CPU 110 enables the NAND_sel signal and reads out data from the NAND-type flash memory 130. When the startup process (activation or initialization) of the printer 10 is completed, the NAND_sel signal is appropriately switched between enabled and disabled under the control of the CPU 110.

The NOR_sel signal is a signal indicating that the CPU 110 selects the NOR-type flash memory 140. When the printer 10 is turned on (initialized), the NOR_sel signal is set to enabled, which indicates the NOR-type flash memory 140 is selected. That is, when the printer 10 is turned on (initialized) at startup or the like, the CPU 110 outputs a signal for selecting the NOR-type flash memory 140 from the NAND-type flash memory 130 and the NOR-type flash memory 140. Then, after reading out data from the NOR-type flash memory 140, the CPU 110 disables the NOR_sel signal. When the startup process of the printer 10 is completed, the NOR_sel signal is appropriately switched between enabled and disabled under the control of the CPU 110.

The CS_ROM signal is a signal that is enabled during the period of executing communication with the NAND-type flash memory 130 or the NOR-type flash memory 140. The CS_ROM signal is assigned to, for example, general purpose input output (GPIO).

When communicating with the NAND-type flash memory 130, the CPU 110 enables the NAND_sel signal. The CPU 110 enables the CS_ROM signal during the period of transmitting and receiving the data by the QSPI signal.

Similarly, when executing communication with the NOR-type flash memory 140, the CPU 110 enables the NOR_sel signal. The CPU 110 enables the CS_ROM signal during the period of transmitting and receiving the data by the QSPI signal.

The RAM_if signal is a signal that executes communication with the RAM 150. More specifically, the RAM_if signal is a signal for transmitting write data to the RAM 150 and for receiving the data read out from the RAM 150.

The notification circuit 120 notifies the NAND-type flash memory 130 and/or the NOR-type flash memory 140 that they are communicating with the CPU 110. The notification circuit 120 outputs a NAND_enabled signal and a NOR_enabled signal.

The NAND_enabled signal is a signal indicating that the CPU 110 and the NAND-type flash memory 130 are communicating with each other. The NOR_enabled signal is a signal indicating that the CPU 110 and the NOR-type flash memory 140 are communicating with each other.

More specifically, when the NAND_sel signal is enabled and the CS_ROM signal is enabled, the notification circuit 120 enables the NAND_enabled signal and thus indicates that communication is in progress between NAND-type flash memory 130 and the CPU 110. On the other hand, when the NOR_sel signal is enabled and the CS_ROM signal is enabled, the notification circuit 120 enables the NOR_enabled signal and thus indicates that communication is in progress between the NOR-type flash memory 140 and the CPU 110. Such notifications help prevent miscommunications between the CPU 110 and the different memories.

The NAND-type flash memory 130 is accessed through a NAND driver. The NAND driver executes a process of restoring data when the data is corrupted, a process of managing data access, and a process of allowing a broken portion not to be used. As described above, the NAND-type flash memory 130 has a characteristic that the access will be slow because the memory must be accessed through the NAND driver.

The NAND-type flash memory 130 has a characteristic that the number of times of writing cannot be guaranteed and the reliability may be low. On the other hand, the unit price per bit is low for NAND-type flash memory 130.

In an example, the NAND-type flash memory 130 stores a printing program, font data, an error log, and the like. The printing program is a program for executing a printing procedure. The font data is information indicating the design of characters in printing. The error log is a log of errors that have occurred in the printer 10.

The NOR-type flash memory 140 has a characteristic that the access is quick. The NOR-type flash memory 140 also has a characteristic that the number of times of writing is generally guaranteed to about 100,000 times and the reliability is high. On the other hand, the unit price per bit is high for NOR-type flash memory 140.

In an example, the NOR-type flash memory 140 stores setting values for hardware sub-components of the printer 10, setting values of sensors in the printer 10, printing record information, and the like. The setting values are generally applied to the hardware components and the like at the time of initializing or startup before the printing process. For example, a setting value can be information for placing a printing head, a motor, and/or the RAM 150 of the printer 10 to be in a usable state. The setting values of the sensors are for adjusting the operations and/or output of the sensors included in the printer 10. The printing record information is information indicating of the printing that has been executed by the printer 10. For example, the printing record information includes information indicating a printing usage amount such as the number of sheets of paper that have been printed by the printer 10.

The RAM 150 is a memory that temporarily stores various programs and various data. For example, the RAM 150 is a double-data-rate synchronous dynamic random access memory (DDR SDRAM). For example, the printing program stored in the NAND-type flash memory 130 is loaded into the RAM 150 when executed by the CPU 110.

Next, certain operations of the printer 10 are described.

Figure 2:
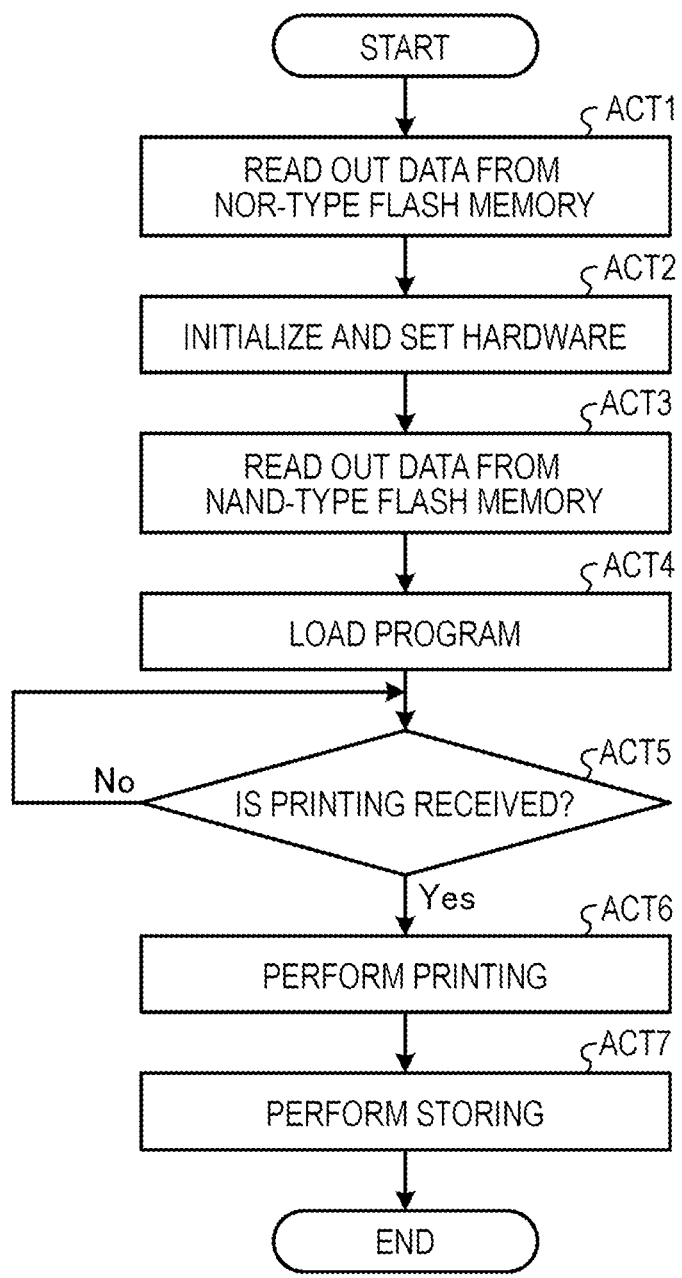
FIG. 2 is a flowchart of a printing process executed by a printer.

FIG. 2 is a flowchart of a printing process executed by the printer 10.

When the printer 10 is powered on, the CPU 110 reads out data stored in the NOR-type flash memory 140 (ACT1). For example, the CPU 110 reads out the setting values for the hardware and the setting values of each sensor from the NOR-type flash memory 140.

The CPU 110 executes initialization and implements the various settings of the hardware by using the information read out from the NOR-type flash memory 140 (ACT2). For example, the CPU 110 initializes the printing head and its operation mode, initializes the sensor, and allows the RAM 150 to be in a usable state.

The CPU 110 reads out data stored in the NAND-type flash memory 130 (ACT3). For example, the CPU 110 reads out the font data and the printing program from the NAND-type flash memory 130.

The CPU 110 loads the printing program into the RAM 150 (ACT4).

The CPU 110 determines whether a printing request for requesting printing is received from another device (ACT5). For example, the CPU 110 determines whether an operation indicating the printing request or a communication indicating the printing request is received. When the printing request is not received (No in ACT5), the CPU 110 waits.

When the printing request is received (Yes in ACT5), the CPU 110 executes printing (ACT6).

When the printing process is ended, the CPU 110 stores the printing amount (e.g., the number of sheet just printed) s in the NOR-type flash memory 140 (ACT7). That is, the CPU 110 stores or otherwise updates the printing amount in the printing record information of the NOR-type flash memory 140.

The printer 10 then ends the printing process.

The printer 10 includes the CPU 110 that is connected to the NOR-type flash memory 140 and the NAND-type flash memory 130 and reads out the data from the NOR-type flash memory 140 when the printer 10 is turned on. That is, when the printer 10 is turned on, the CPU 110 reads out data such as setting values of hardware used for the startup process.

When initialization of the hardware or the like has been completed, the CPU 110 reads out a printing program from the NAND-type flash memory 130 and loads the printing program into the RAM 150. As such, the highly reliable NOR-type flash memory 140 is utilized to store the data requiring high reliability such as the data used at the initialization. The NAND-type flash memory 130 having a low unit price per bit is utilized to store a large amount of data for the printing program or the like. That is, the printer 10 can store data in either the NOR-type flash memory 140 or the NAND-type flash memory 130 depending on the size and property (e.g., end use) of the data.

Second Embodiment

Figure 3:
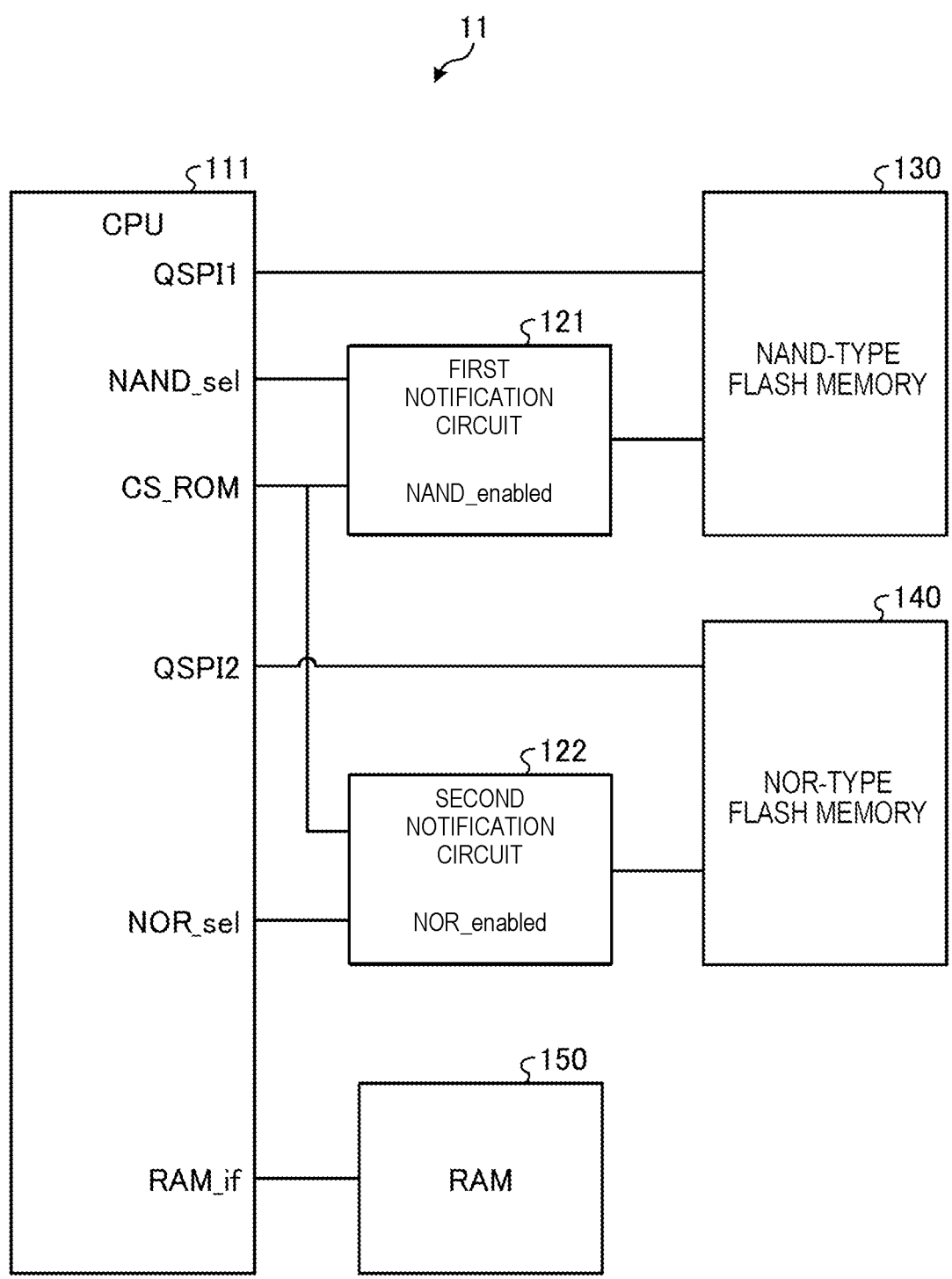
FIG. 3 is a diagram illustrating a control mechanism of a printer according to a second embodiment.

A printer 11 according to a second embodiment has a circuit configuration different from that of the first embodiment. FIG. 3 is a diagram illustrating a control mechanism included in the printer 11.

A CPU 111 of the printer 11 outputs to the NAND-type flash memory 130 through a QSPI1 signal. The CPU 111 outputs to the NOR-type flash memory 140 a QSPI2 signal. The printer 11 includes a first notification circuit 121 and a second notification circuit 122.

Similarly to the QSPI signal, the QSPI1 signal is output to the NAND-type flash memory 130 by the Quad SPI. That is, the QSPI1 is a serial interface for the CPU 111 to communicate with the NAND-type flash memory 130.

Similarly, the QSPI2 signal is output to the NOR-type flash memory 140 by the Quad SPI. That is, the QSPI2 is a serial interface for the CPU 111 to communicate with the NOR-type flash memory 140.

The first notification circuit 121 notifies that the NAND-type flash memory 130 is communicating with the CPU 111. That is, the first notification circuit 121 outputs the NAND_enabled signal indicating that the CPU 111 and the NAND-type flash memory 130 are communicating with each other.

The second notification circuit 122 notifies that the NOR-type flash memory 140 is communicating with the CPU 111.

That is, the second notification circuit 122 outputs the NOR_enabled signal indicating that the CPU 111 and the NOR-type flash memory 140 are communicating with each other.

As described above, similarly to the printer 10, the printer 11 can store data in either the NAND-type flash memory 130 or the NOR-type flash memory 140.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:
    a first flash memory of a NOR type;
    a second flash memory of a NAND type;
    a processor configured to control execution of a printing operation using information stored in the first and second flash memories; and
    a notification circuit connected between the processor and each of the first and second flash memories, wherein
    the processor is further configured to, at startup of the printer, select the first flash memory for reading first information stored in the first flash memory, issue a first signal indicating that the first flash memory has been selected, to the notification circuit, and perform an initialization process using the first information, and
    the notification circuit is configured to, in response to the first signal, notify the first flash memory that the processor and the first flash memory are communicating with each other.

2. The printer according to claim 1, wherein the first information includes a setting value for a hardware unit.

3. The printer according to claim 1, wherein the processor is further configured to:
    after the initialization process, read second information stored in the second flash memory and control a printing process using the second information.

4. The printer according to claim 3, wherein the second information includes a printing program for the printing process.

5. The printer according to claim 3, wherein, the processor is further configured to store a total number of sheets printed during the printing process in the first flash memory.

6. The printer according to claim 1, wherein the processor is further configured to select the second flash memory for reading second information during a printing process, and issue a second signal indicating that the second flash memory has been selected, to the notification circuit.

7. The printer according to claim 6, wherein the notification circuit is further configured to, in response to the second signal, notify the second flash memory that the processor and the second flash memory are communicating with each other.

8. A printer, comprising:
    a first flash memory of a NOR type;
    a second flash memory of a NAND type;
    a processor configured to control execution of a printing operation using information stored in the first and second flash memories;
    a first notification circuit connected between the processor and the second flash memory; and
    a second notification circuit connected between the processor and the first flash memory, wherein
    the processor is further configured to read first information stored in the first flash memory and perform an initialization process using the first information at startup of the printer,
    the first notification circuit is configured to notify the second flash memory that the processor and the second flash memory are communicating with each other during a printing process, and
    the second notification circuit is configured to notify the first flash memory that the processor and the first flash memory are communicating with each other during the initialization process.

9. A method of controlling a printer including a processor, a first flash memory of a NOR type, and a second flash memory of a NAND type, the method comprising:
    at startup of the printer, by the processor, selecting the first flash memory for reading first information from the first flash memory, issuing a first signal indicating that the first flash memory has been selected, and performing an initialization process using the first information; and
    in response to the first signal, notifying the first flash memory that the processor and the first flash memory are communicating with each other.

10. The method according to claim 9, wherein the first information includes a hardware setting value for a printing operation.

11. The method according to claim 9, further comprising:
    after the initialization process, reading second information stored in the second flash memory and controlling a printing process using the second information.

12. The method according to claim 11, wherein the second information includes a printing program for the printing process.

13. The method according to claim 11, further comprising:
    storing a total number of sheets printed during the printing process in the first flash memory.

14. The method according to claim 9, further comprising:
    selecting the second flash memory for reading second information during a printing process, and issuing a second signal indicating that the second flash memory has been selected.

15. The method according to claim 14, further comprising:
    in response to the second signal, notifying the second flash memory that the processor and the second flash memory are communicating with each other.

* * * * *